July 17, 1934.　　C. GARDNER　　1,966,584
CALCULATING MACHINE
Filed July 12, 1932　　12 Sheets-Sheet 1
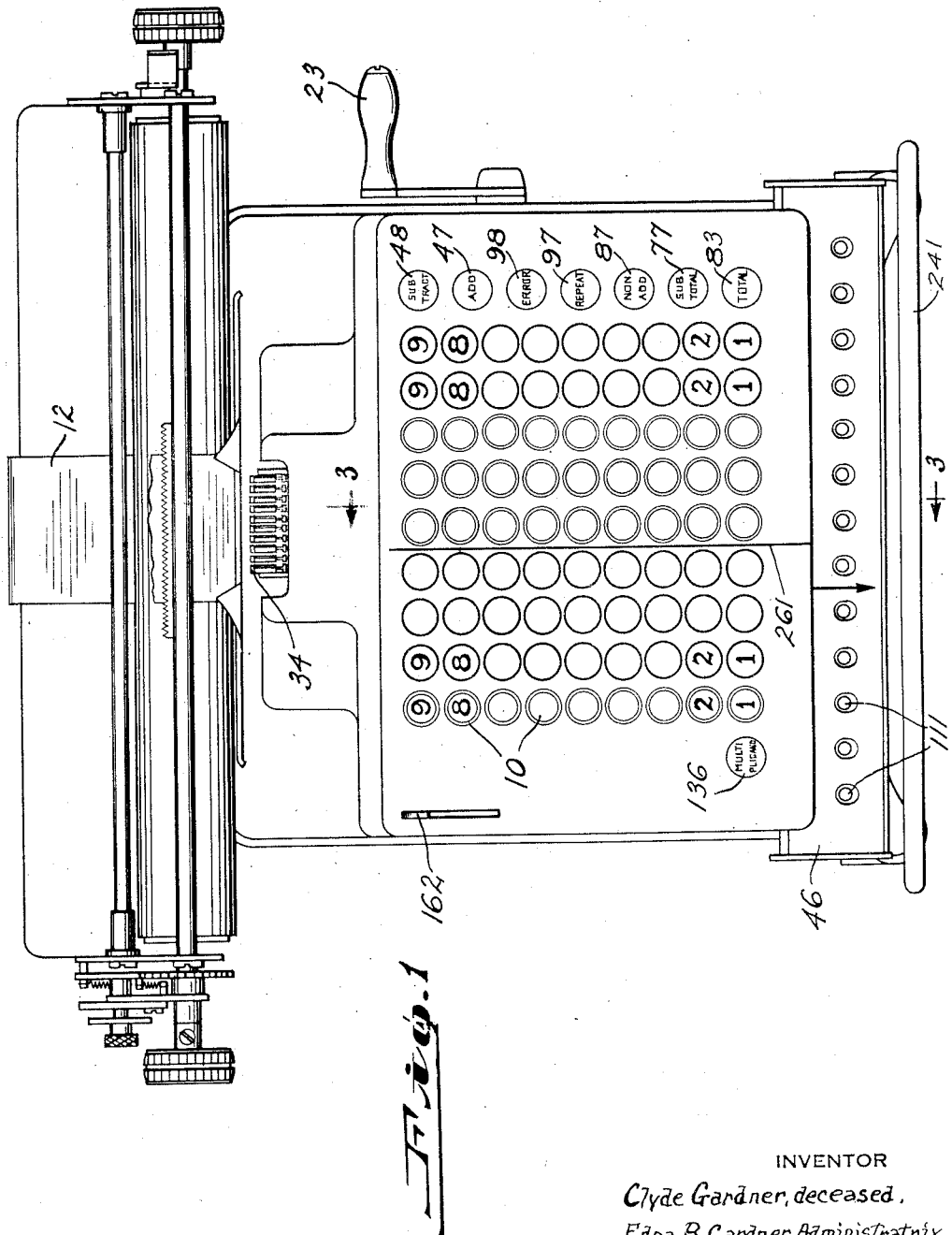
INVENTOR
Clyde Gardner, deceased,
Edna B. Gardner, Administratrix.
Stuart Hilder ATTORNEY

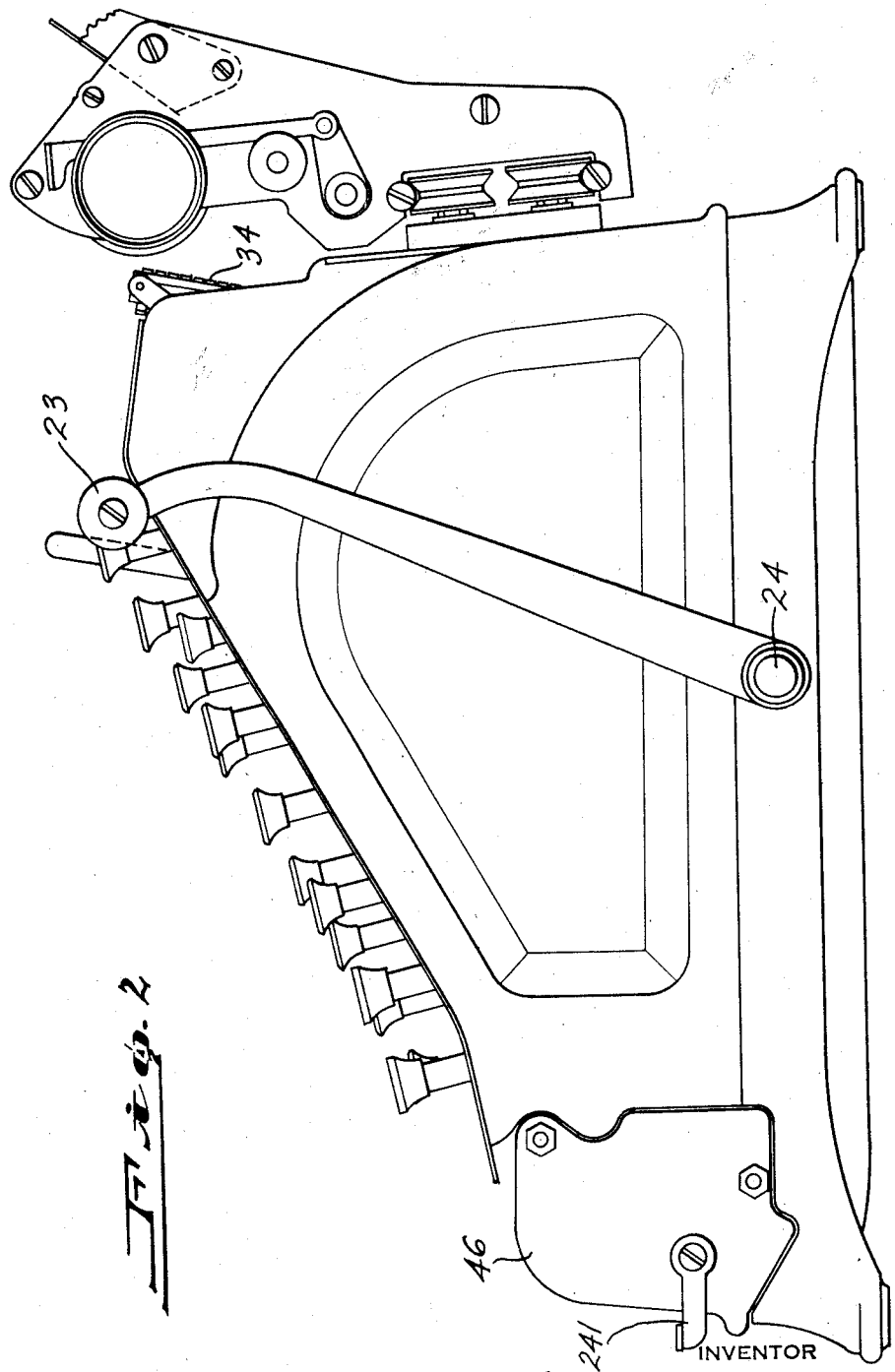

July 17, 1934.  C. GARDNER  1,966,584
CALCULATING MACHINE
Filed July 12, 1932   12 Sheets-Sheet 3
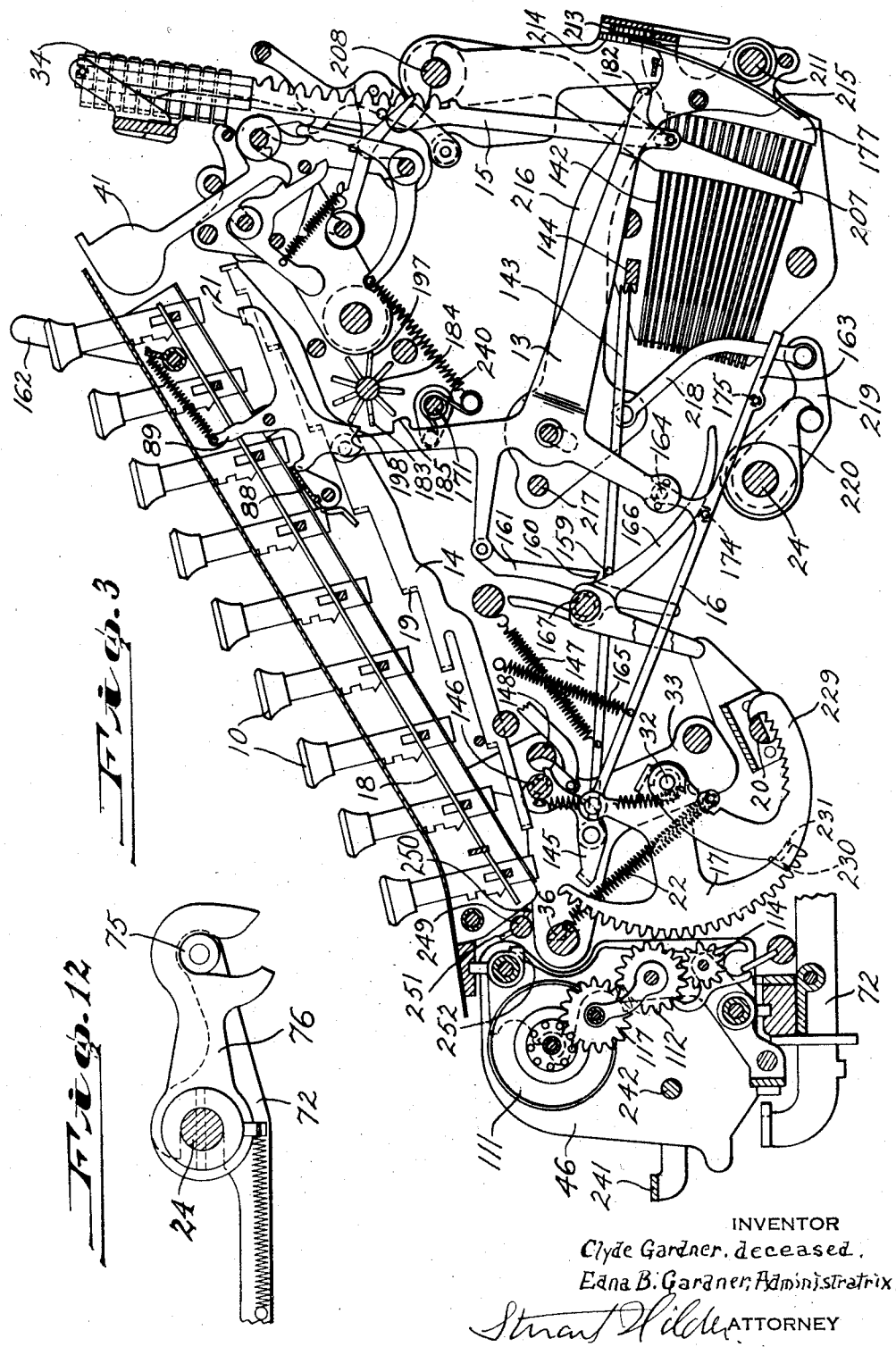
INVENTOR
Clyde Gardner, deceased.
Edna B. Gardner, Administratrix.
Stuart Wilde ATTORNEY

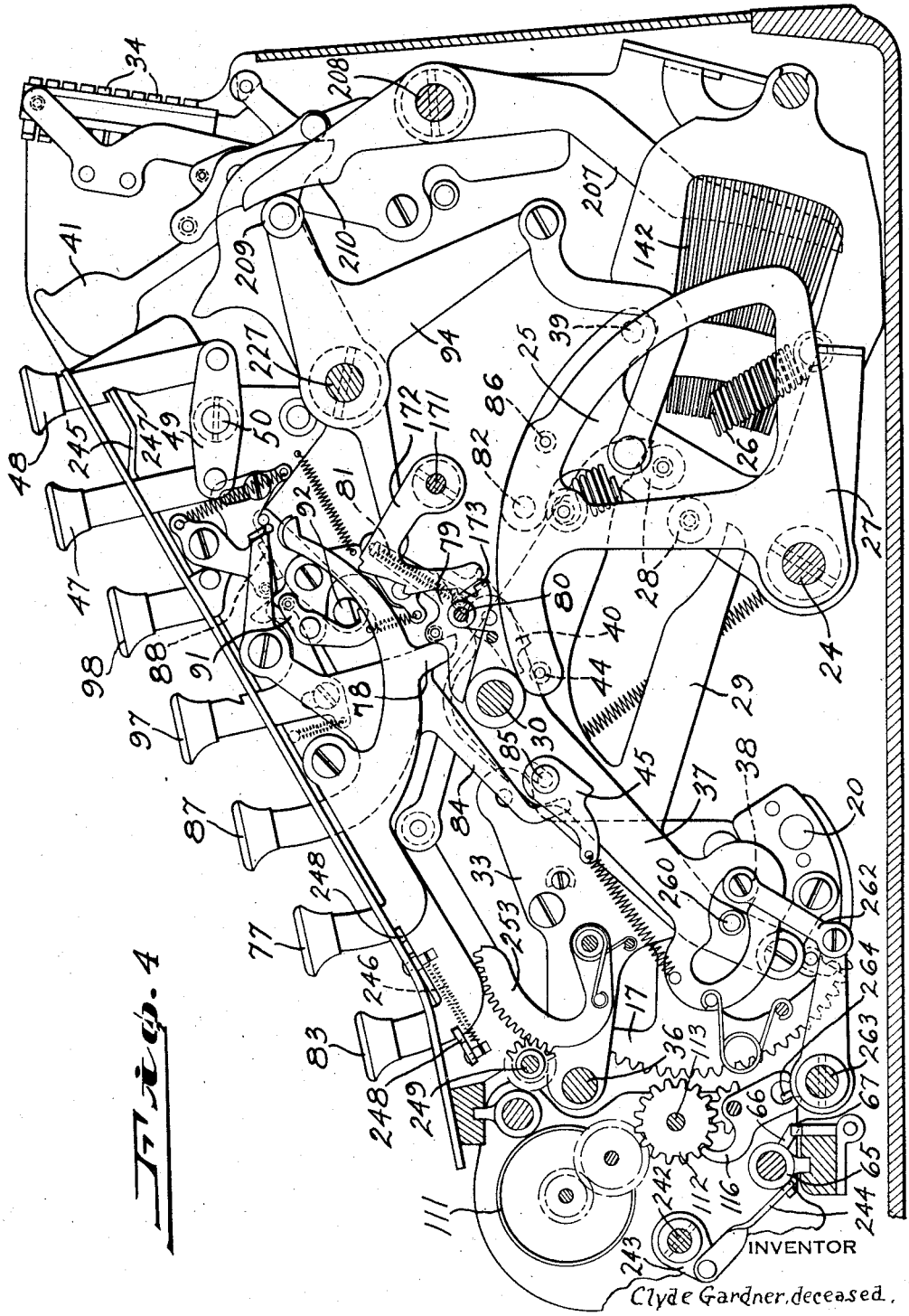

July 17, 1934.    C. GARDNER    1,966,584
CALCULATING MACHINE
Filed July 12, 1932    12 Sheets-Sheet 5
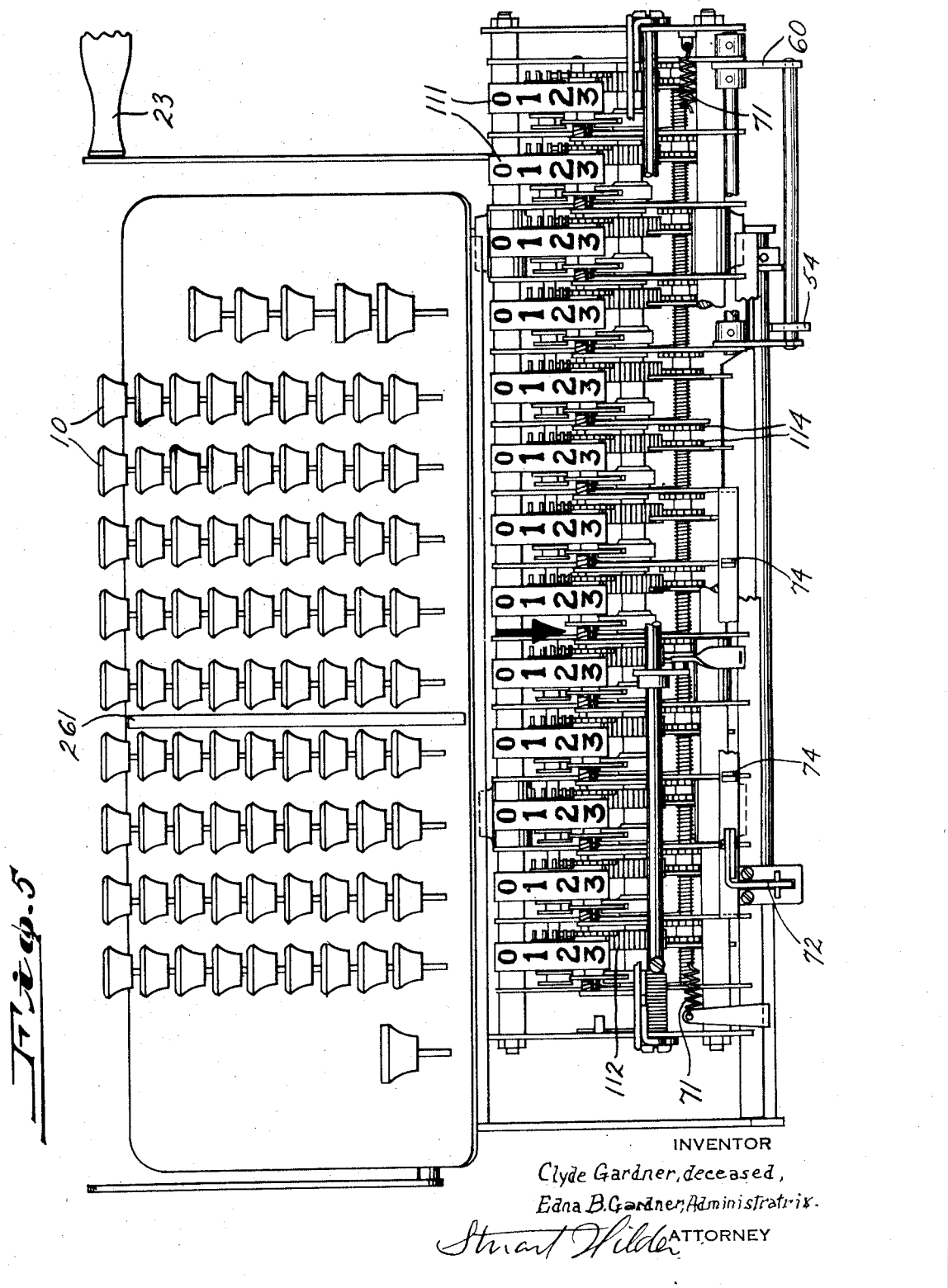
INVENTOR
Clyde Gardner, deceased,
Edna B. Gardner, Administratrix.
Stuart Wilder ATTORNEY

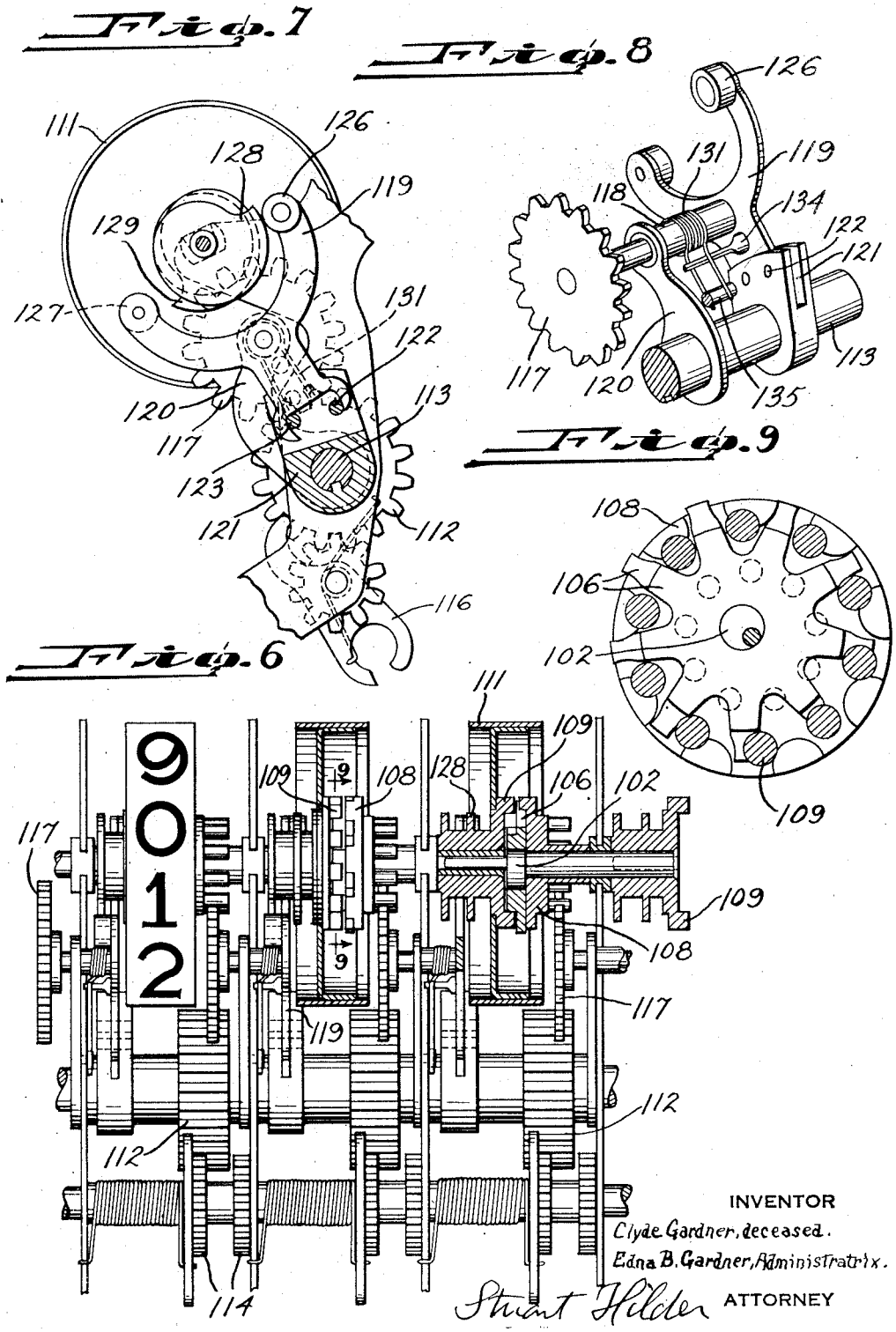

July 17, 1934.   C. GARDNER   1,966,584
CALCULATING MACHINE
Filed July 12, 1932   12 Sheets-Sheet 7
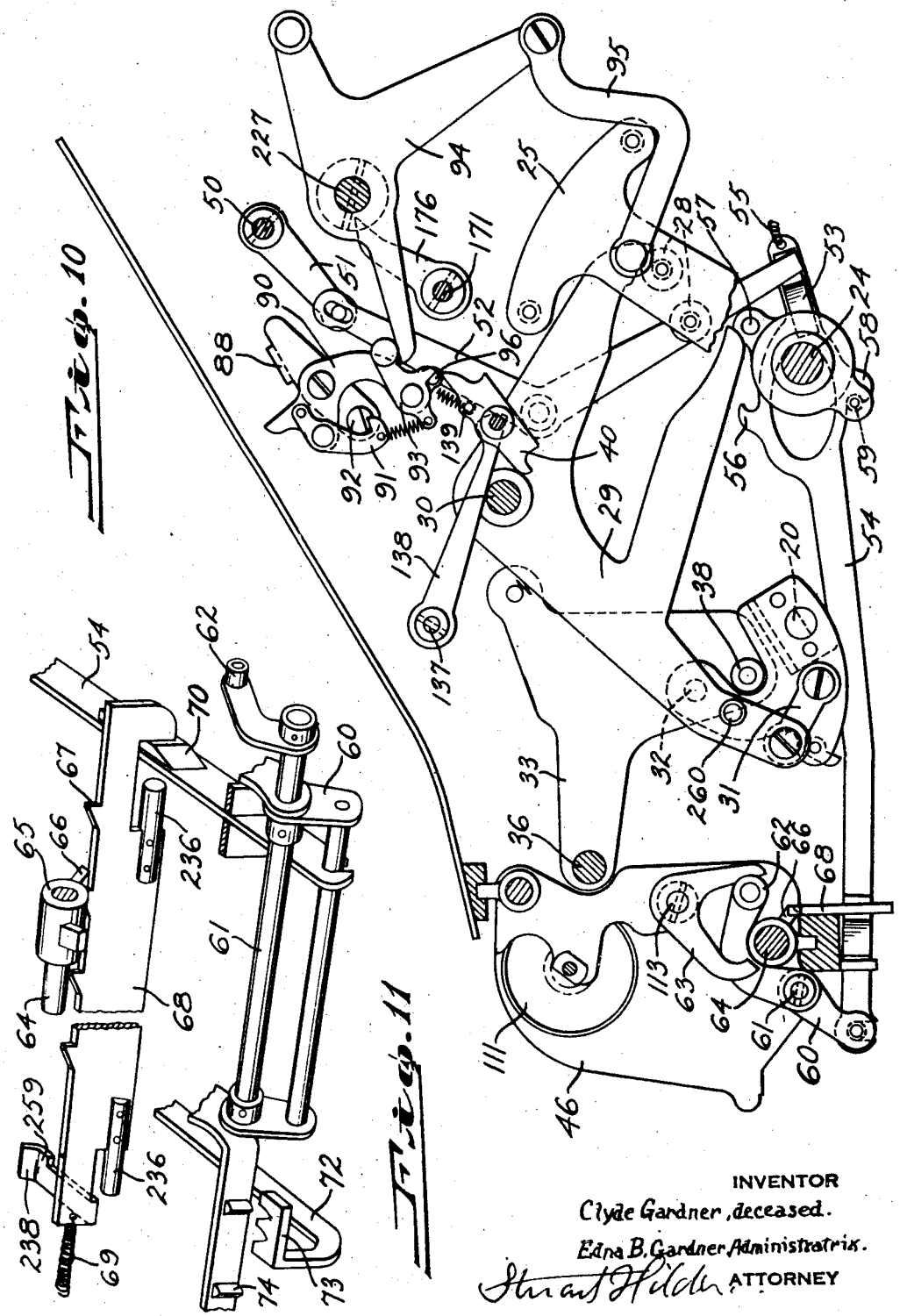
INVENTOR
Clyde Gardner, deceased.
Edna B. Gardner, Administratrix.
Stuart Hilder ATTORNEY

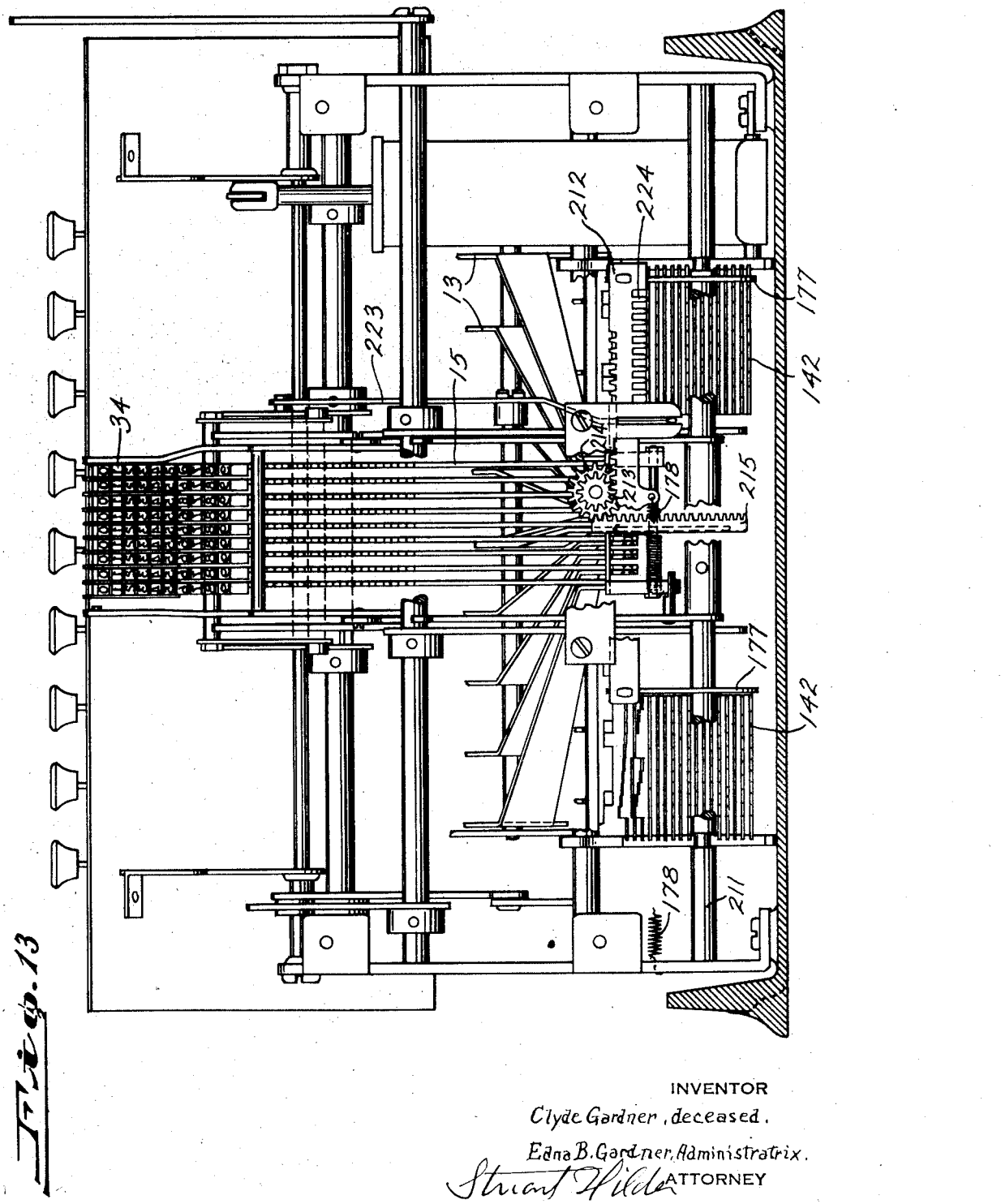

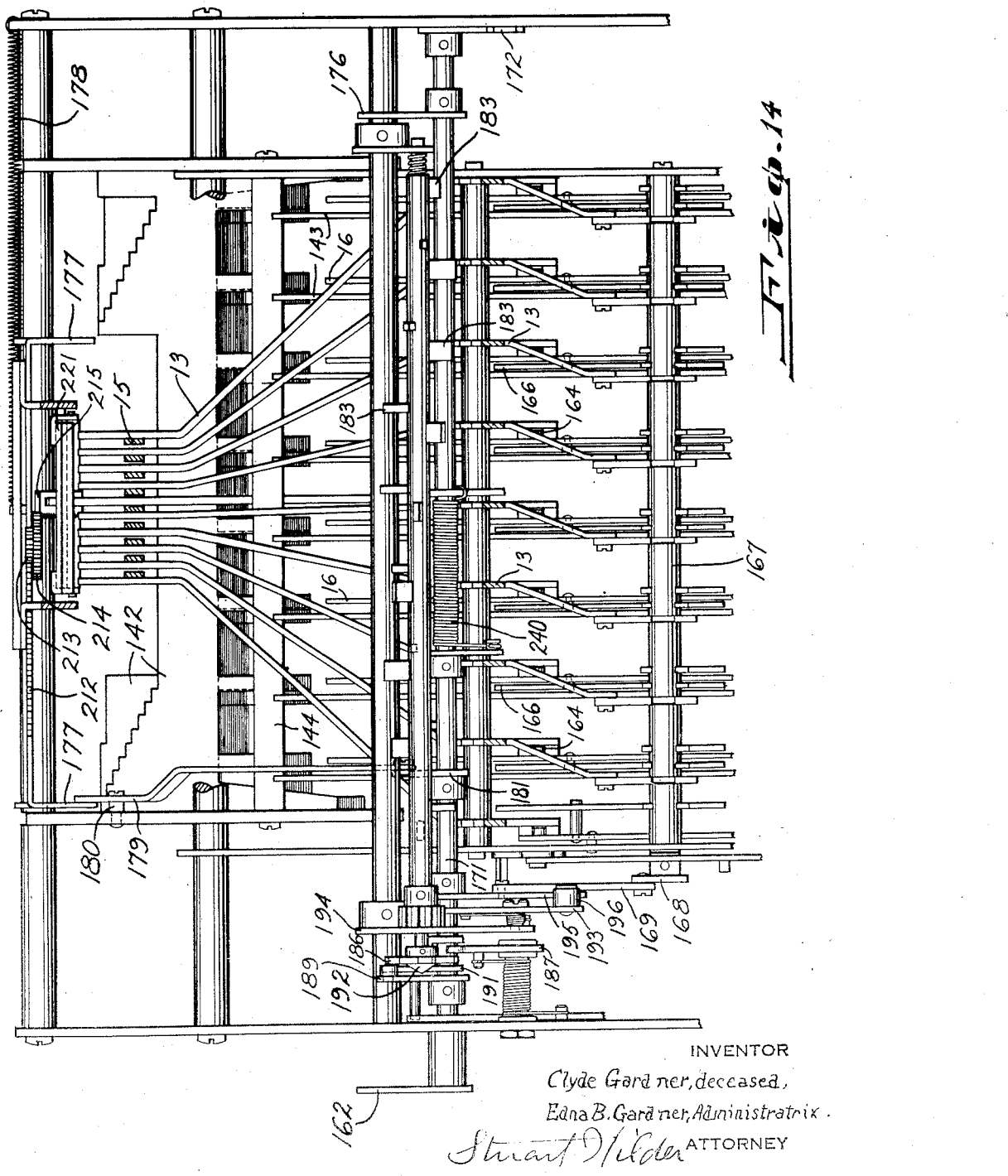

July 17, 1934.   C. GARDNER   1,966,584
CALCULATING MACHINE
Filed July 12, 1932   12 Sheets-Sheet 10

Fig. 15

INVENTOR
Clyde Gardner, deceased,
Edna B. Gardner, Administratrix.
Stuart Hilder  ATTORNEY

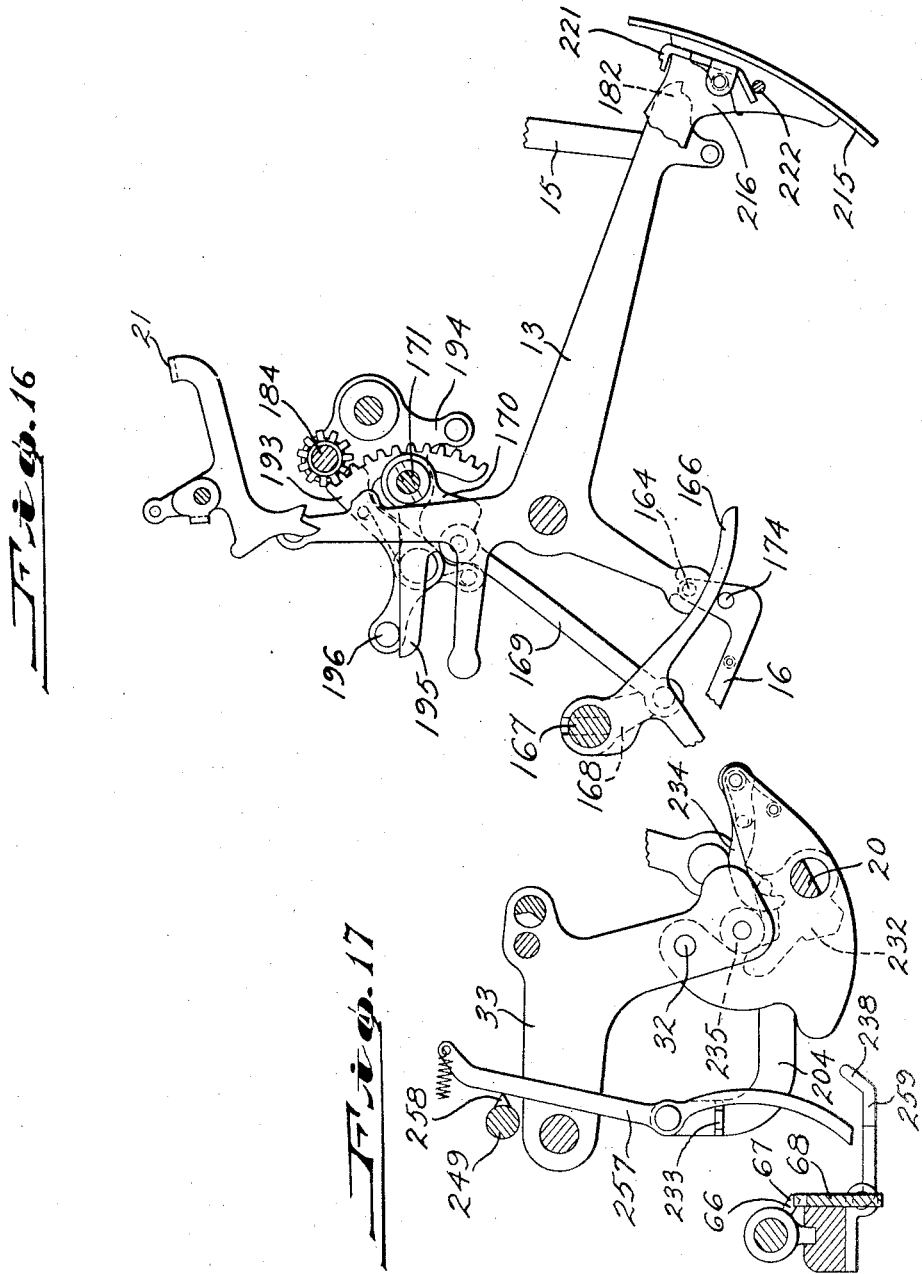

July 17, 1934.  C. GARDNER  1,966,584
CALCULATING MACHINE
Filed July 12, 1932  12 Sheets-Sheet 12

INVENTOR
Clyde Gardner, deceased.
Edna B. Gardner, Administratrix
Stuart Hilder  ATTORNEY Patented July 17, 1934

1,966,584

UNITED STATES PATENT OFFICE 1,966,584

CALCULATING MACHINE

Clyde Gardner, deceased, late of Ebensburg, Pa., by Edna B. Gardner, administratrix, Ebensburg, Pa., assignor to Gardner Company, Orange, N. J., a corporation of Delaware Application July 12, 1932, Serial No. 622,033

19 Claims. (Cl. 235—60)

The invention has relation to calculating machines, and more particularly to multiplier mechanism therefor.

According to a principal feature of the invention, differentially settable value retaining slides are mounted in fixed relation to a multiple order keyboard, and means are provided for placing depressed digit keys in various denominational rows successively in control of said slides, thereby setting corresponding multiplier values therein.

This arrangement secures a number of advantages. In a listing machine it permits the printing of the multiplicand, the multiplier and the product by the same set of type and in the same column of the record sheet. In a direct multiplying machine (as distinguished from machines which multiply by the method of repeated addition) it permits the entering of the factors and the selection and registration of the product by a minimum number of mechanical elements (one keyboard, one set of setting levers, one set of partial product plates, etc.). Obviously, also, it avoids the relative shifting of somewhat complex and heavy mechanisms.

The invention is herein shown as applied to a listing calculating machine of the general type disclosed in U. S. Patent No. 1,867,002 issued on July 12, 1932 to Clyde Gardner, deceased. Considerable modifications of the mechanism of this patent have, however, been made in the present disclosure.

The tens carry mechanism herein shown is in accordance with that of an application of the same inventor filed of even date herewith and entitled Registers, being a modification of the tens carry mechanism of U. S. Patent No. 1,828,180 issued on October 20, 1931 to Clyde Gardner, deceased, and entitled Calculating machines.

The invention consists in the novel construction and combination of parts, as set forth in the appended claims.

In the accompanying drawings, illustrating a preferred embodiment of the invention:

Fig. 1 is a plan view of a calculating machine embodying the invention.

Fig. 2 is a right hand elevation of the same.

Fig. 3 is a section taken on line 3—3 of Fig. 1.

Fig. 4 is a right hand elevation, with the end casing removed and parts broken away.

Fig. 5 is a front elevation of the machine, with the register casing removed.

Fig. 6 is a detail front view of a series of register wheels, partly in section.

Fig. 7 is a detail right hand elevation of a register wheel and associated tens carry mechanism.

Fig. 8 is a detail perspective view of certain parts of the tens carry mechanism.

Fig. 9 is a detail section, taken on line 9—9 of Fig. 6.

Fig. 10 is a detail right side elevation of the mechanism for setting the register for additive or subtractive operation.

Fig. 11 is a detail perspective view of parts shown in Fig. 10.

Fig. 12 is a detail elevation of a portion of the register carriage locking mechanism.

Fig. 13 is a rear elevation of the machine with the platen carriage and rear casing removed.

Fig. 14 is a plan view of the multiplier plates and associated parts.

Fig. 15 is a fragmentary left hand elevation of the machine with the left side case removed.

Fig. 16 is a detail right hand elevation of parts of the multiplier selector mechanism.

Fig. 17 is a detail elevation of parts of the multiplier mechanism controlling movement of the register carriage.

General operations

Figure 18:
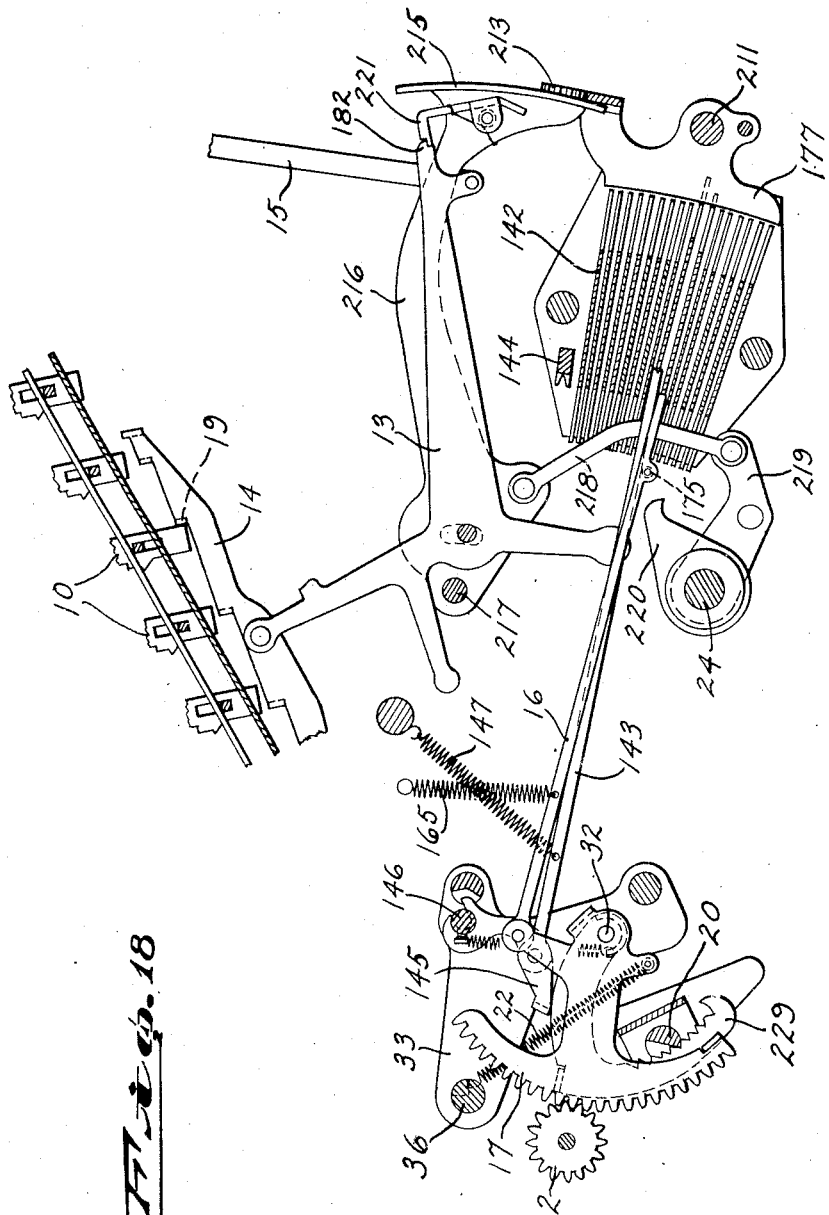
Fig. 18 is a a detail elevation of the product selecting mechanism, with the parts shown in operative position.

Amounts set up on the keys 10 (Fig. 1) may be registered on the wheels 111 and printed upon a record strip 12 by the operation of levers 13 (Fig. 3). One arm of each of these levers is pivotally connected to a stop bar 14 extending beneath a bank of keys 10, there being a stop bar 14 and lever 13 for each bank of keys. A second arm of each lever 13 is connected to a type bar 15 and a third arm has link connection 16 with a segment rack 17 adapted to operate the related register wheel.

The keys 10 are provided with shoulders cooperating with the usual locking plate 18, whereby the lower end of a depressed key is held in the path of movement of a related lug 19 of the stop bar 14. Normally bar 14 and lever 13 is held in retracted position by means of a bail 20 hereinafter more fully described. A zero stop 21 normally lies in the path of movement of the bar 14, said stop being rocked to inoperative position by the locking plate 18 upon depression of any key of the bank, and held in disengaged position by means of a suitable offset portion of the keystem.

The segments 17 are held against bail 20 by means of springs 22, these springs tending when bail 20 is moved, to rock the levers 13 until the related bars 14 contact with the depressed keys. Bail 20 is rocked by means of a hand lever 23, connected to the end of a shaft 24 (Figs. 3, 4 and 10). An arm 25 loosely mounted on shaft 24 has spring connection 26 with an arm 27 fast to said shaft. Arm 25 is provided with two rollers 28 engaging opposed cam surfaces of a rocker 29 pivoted in the framing of the machine at 30. Rocker 29 has link connection 31 with the end plate of bail 20 pivoted at 32 on a frame 33. As lever 23 is pulled forwardly, the above-described parts will rock, bail 20 moving about point 32 and allowing the segment racks 17 to be drawn upwardly until they are stopped by engagement of the lugs 19 with the stems of the keys 10. When the lever 23 has reached its extreme forward position the levers 13 have thus been set differentially to represent the amounts set up on the keyboard, and the type bars 15 have been moved upwardly to bring the appropriate type 34 to the printing line.

The printing hammers 41 are now tripped, by mechanism fully shown in U. S. Patent No. 1,867,002 hereinbefore referred to, these hammers being then restored to normal position on the return movement of lever 23, during which movement also the segments 17 will be engaged with the register gears, and, in moving back to normal position, the amounts set up thereon will be transferred to the register wheels 111, the type bars 15 being simultaneously retracted. The engagement of the segments 17 with the register gears 112 is accomplished as follows:

As lever 23 begins its rearward movement, under the influence of spring 35 (Fig. 15), the frame 33 (Fig. 4) is moved about its pivot point 36 by means of the cam end of a lever 37 engaging a stud 38 of the frame. Lever 37, which is fulcrumed at point 30 is engaged by a pin 39 on arm 25, through pawl 40 pivoted upon said lever 37, this engagement taking place at the end of the forward stroke of operating lever 23. The segments 17 are mounted on a shaft 32 (Fig. 3) supported in the end plates of frame 33, so that as said frame is cammed forward and downward about point 36, the segments 17 will be carried to engagement with the gears 112. The rocking of frame 33 will also, through link 262 (Fig. 4) rock a shaft 263 having a blade 264 engaging detents 116 of the gears 112 to disengage the detents from the gears. Lever 23 continuing to move to the rear, pin 39 will disengage from pawl 40 and the frame 33 will remain in position as set until a pin 44 of arm 27 comes in contact with a pawl 45 of lever 37 and rocks said lever upwardly to its normal position, bringing the segments 17 out of engagement with the gears 112. Finally, pin 44 disengages from pawl 45 and the parts are restored to normal position, the amount set on the keys having been added into the register wheels 111 and printed upon the record strip 12.

The register

The register wheels 111 are mounted in a transversely shiftable carriage 46 and are provided with a differential gear tens carry mechanism, as set forth in the co-pending application hereinbefore referred to.

Each register wheel 111 (Figs. 5 to 9) has secured thereto a ten tooth pin or internal gear 109, meshing with a nine tooth gear 106, mounted upon an eccentric 102, fast to the lower order wheel 111. The gears 106 constitute the differentially advanced gears of an "entocyclic" system, such as that described in the Patent No. 1,828,180, hereinbefore mentioned, being rotated on their axes by nine tooth gears 108 and being carried about the axes of the internal gears 109 by rotation of the eccentrics 102 of the lower order register wheels. Gears 108 are driven, through intermediate gears 117, by the adding gears 112 hereinbefore referred to, in accordance with the values set in the keys 10. The carrying of tens is effected in the manner characteristic of entocyclic gearing by a complete revolution of the nine toothed gears 106 within the ten tooth gears 109.

This tens carry, however, is modified by means serving to counteract the "crawl" or one-tenth step movement of the driven gear, so that the carry impulse will be transmitted to the higher order wheel at a single step of movement, as the lower order wheel passes from 9 to 0 registering position, or vice versa. Thus digits marked upon the register wheels 111 will remain in true alignment at the sight openings of the carriage 46.

The means for counteracting the crawl comprises a cam 128, fixed to the lower order wheel 111 and operating a follower 126 mounted in a yoke 119, in a sleeve 118 of which yoke the intermediate gear 117 is journaled. The yoke 119 is supported by an arm 120, loosely mounted upon the adding gear shaft 113. Carried upon the sleeve 118 is a spring 131, the ends of which embrace pins 134 and 135, the pin 134 being secured to the yoke 119 and the pin 135 to a carriage frame. The lower end of yoke 119 is held to one side of shaft 113 by a pin 122 of arm 121, splined upon the normally stationary shaft 113, thereby holding spring 131 under tension and holding follower 126 yieldably against cam 128.

When the lower order wheel 111 stands at 0, follower 126 rests at the low point of cam 128, and upon rotation of said wheel the rise of the follower will rock yoke 119 and carry intermediate gear 117 around adding gear 112 and thereby rotate gears 117 and 106 sufficiently to counteract the movement imparted to the latter by eccentric 102. As wheel 111 moves from 9 to 0 registering position, follower 126 will fall from the highest to the lowest point of cam 128, bringing the higher order intermediate gear 117 back to normal position and rotating gear 106 the full amount determined by the previous rotation of eccentric 102. The resulting movement transmitted to the higher order wheel 111 is equal to the difference between gears 106 and 109, that is, one tooth or one tenth.

The register performs subtraction by a reverse movement of the above-described gearing, and the tens carrying mechanism is set for subtractive operation by setting the shaft 113 in a second position, by counter-clockwise rotation, as viewed in Figure 7. This, by means of a pin 123 on arm 121, will rock yoke 119 and hold a follower 127 in contact with a reversely disposed cam 129 of the lower order register wheel. Yoke 119 will now be reciprocated reversely about intermediate gear 112, to counteract the subtractive movement of eccentric 102.

Special operations

The registers are set for addition or subtraction by means of an add key 47 and a subtract key 48, respectively, these keys, seen in Fig. 4, being connected by a rocker 49, fast to a shaft 50 (Fig. 10). Shaft 50 has an arm 51 engaging a lever 52, the lower end of which contacts a lateral cam projection 53 on shifting lever 54. According to the position of lever 52 on cam 53, lever 54 will be held against the tension of spring 55 in one of two laterally moved positions. In the position illustrated in Fig. 10 the parts are set for subtraction (and a subtractive operation has already taken place), shifting lever 54 being held to the left by lever 52, with a subtraction lug 56 in the plane of a pin 57 mounted upon a crank arm of shaft 24. If the add key 47 is now depressed, lever 52 will move down the cam surface 53, and spring 55 will pull shifting lever 54 so that lug 56 will move out of the plane of pin 57, and an addition lug 58 of the shifting lever will be moved into the path of a pin 59, mounted on an opposite crank arm of shaft 24. Now, upon forward movement of shaft 24, the shifting lever will be pulled to the rear to set the register into additive position. This is done by means of a frame 60, with which the lever 54 has sliding contact, frame 60 being pivoted in the carriage at 61, and having a roller 62 engaging a double armed lever 63, fastened upon the shaft 113.

This as described under the heading of Register, serves to set the transfer mechanism for reverse operation. The same movement of the lever 54 serves to space the carriage over from addition to subtraction or from subtraction to addition position as follows:

A frame rod 64 of the carriage has a collar 65 mounted thereon and provided with an escapement lug 66 normally lying in the plane of a series of escapement teeth 67 (Fig. 11) of a slidable bar 68 mounted in the main frame of the machine. The trunnion bearings of the bar 68 provide for a slight lateral movement thereof, the bar being normally held to the left by a spring 69. The right hand end of bar 68 engages a lateral face of shifting lever 54, which face is provided with a cam portion 70, adapted in the forward movement of lever 54 to displace the lug 66 and carriage 46 to the right, to take the gears 112 out of alignment with the segments 17 and to bring reversing gears 114 into alignment with said segments, the latter gear being in mesh with gear 112 and serving to drive the same in a reverse direction when actuated by segment 17. Obviously, reverse movement of the shifting lever 54 will allow spring 69 and the carriage spring 71 (Fig. 5) to move the carriage back to adding position.

During a registering operation the carriage is locked in position as adjusted by means of a bar 72 (Figs. 3, 11 and 12) said bar having a notched forward end 73 adapted to engage projections 74 of the carriage frame. The rearward end of bar 72 is connected by a roller 75 with a cam arm 76 of the operating shaft 24, so that as said shaft is rocked, the notched end 73 of the bar will be engaged with the teeth 74 lying opposite to the notches at the time.

Means are provided for varying the engaging movement of the racks 17, so that the machine may operate to print totals or sub-totals, and to print without registering upon the dials, this mechanism operating as follows: The sub-total key 77 is provided with a lug 78 (Fig. 4), said lug engaging a pin of a pawl 79 pivoted on a frame of the machine. Said pawl controls the position of the pawl 40, previously described as mounted upon the cam lever 37, the configuration of this latter pawl being best shown in Fig. 10. As key 77 is depressed and pawl 79 is swung about its pivotal point 80, a spring 81 connected to said pawl and to the pawl 40 will move the forward end of said pawl out of cooperating position with pin 39, and will bring the rear end of pawl 40 into position of engagement with a pin 82 of the rock arm 25. Thus, upon forward movement of operating lever 23, cam lever 37 will be rocked downward and the segment 17 engaged with gears 112, while upon reverse movement of lever 23, pins 39 and 82 will move idly under pawl 40.

The sub-total key is provided with mechanism, fully disclosed in the above-mentioned Patent No. 1,867,002 for clearing the keyboard, and for releasing the latches 21 of the stop bars 14. Thus, upon movement of the lever 23 the segments 17 will be rotated by their springs without interference from the keyboard, this movement continuing (the segments being engaged with the gears 112 as above-noted) until the register wheels 111 are moved backwardly to 0 registering position, at which time the follower 126 will be engaged by the steep face of the cam 128 and further movement of the wheel, and therefore, of the related segment will be stopped.

Type bars having been moved from normal position until the registration has been subtracted from the numeral wheels, it follows that the type 34 will display the registration which has been taken from the wheels 111, and the printing hammers 41 being tripped, as described for the other operations, this total will be printed on the record strip. On the reverse movement of lever 23, since the segments 17 remain in engagement with the gears 112, these segments, in returning to normal position will restore the registration to the register wheels 111, the segments being then disengaged from the gears as in other operations. Finally, the sub-total key is released, and the latches 21 are allowed to drop to active position, by means shown in the above-mentioned patent.

Totals are taken in the same manner as sub-totals except that the amount transferred from the register wheels 111 to the printing mechanism is not restored to the wheels, the latter being left in zero registering position at the end of the operation. Therefore, the mechanism operated by the sub-total key 77 is similarly operated by the total key 83, but the total key is also provided with an arm 84 (Fig. 4) engaging the pivot stud 85 of the pawl 45 and moving said pawl rearward along a slot of a cam lever 37 upon which it is mounted. This rearward positioning of pawl 45 brings the pawl in rear of a pin 86 on arm 27 when the lever 23 is in extreme forward position. Therefore, pin 82 will operate through pawl 45 to raise the cam lever 37 and disengage the segments 17 from the gears 112 before the effective return stroke of the lever.

In order to provide for printing items without registering them on the wheels 111 a non-add key 87 is provided, said key having a lug acting upon pawl 79, but the key movement being shorter than that provided for the keys 77 and 83 so that pawls 79 will move pawl 40 to an intermediate position, in which both ends of the pawl lie out of the path of the various cooperating pins, thus, cam lever 37 will remain in its raised position, with the segments 17 disengaged from the gears 112 during any operation in which the key 87 is held depressed.

Normally the keys 10 are unlocked and allowed to rise to normal position near the end of each stroke of the operating lever 23, the unlatching of the keys being accomplished by means of a bail 88 (Fig. 3) overlying the series of latches 21, which latches are provided with arms 89 engaging notches of the locking plates 18, so that as the latches 21 are moved to disengaged position the plates 18 will be moved out of engagement with the shoulders of the keys, whereupon the key springs, not shown, will return the keys to normal position. Bail 88 is operated during the handle movement by means of a rocker 90 (Fig. 10) having a hooked pawl 91 adapted to engage a stud 92 of the end plate of the bail. Rocker 90 is also provided with a pawl 93 having a stud engaged by an arm of lever 94 having link connection 95 with the rock arm 25. Thus, upon forward movement of lever 23 and arm 25, lever 94 will move idly past the yielding pawl 93, and upon the return movement lever 94, removing pawl 93 against a pin 96 of rocker 90, will move the rocker hook pawl 91 and bail 88 to release the keys, at the end of the movement pawl 93 will escape from lever 94 and the parts will be restored to normal position.

A repeat key 97 (Fig. 4) is provided which, when latched in depressed position by engagement of a notch of the keystem with the keyboard plate, will hold hook pawl 91 out of contacting position with stud 92, so that the above-described non-repeat mechanism will be inoperative to clear the keyboard.

The usual error or keyboard clearing key 98 is provided, for clearing the keyboard at will, by rocking of bail 88.

Multiplication

The automatic multiplication mechanism of the present invention is of the type wherein a series of stepped plates serve to set up the partial products, these plates constituting a mechanical representation of the multiplication table. The multiplicand and the multiplier is selected on these plates in accordance with the settings of a single series of keys, the multiplicand being first set up and stored in the machine and the multiplier being thereafter set up on the same keys. The operating lever is then pulled once for each denominational multiplier, both the units and the tens of each partial product being registered on the wheels 111 at each reciprocation of lever 23. Each pull of lever 23 also steps the register carriage 46 toward the left in order to change the denominational relation of the register wheels and the amounts set in the machine in well known manner.

The machine is designed to print both factors and the product, and to clear the register wheels.

The multiplicand is set up on the keys 10 in the usual manner and a multiplicand key 136 is depressed, said multiplicand key presetting certain means to become operative upon subsequent movement of the operation lever 23. Key 136 also sets the non-add mechanism into operative position (Figs. 10 and 15), the key being fast to a shaft 137, having an arm 138 adapted to contact with a pin 139 on the pawl 40 and to hold said pawl in its midway or inactive position (with both ends of the pawl free of the pins in arms 25 and 27) so long as key 136 is depressed. Key 136 also has an end 140 adapted to engage a lug 141 of bail 88, displacing the bail until the end of the extension 140, escaping lug 141 is latched in raised position thereby. The setting of the multiplicand and of key 136 having been completed, the operating lever 23 is reciprocated, this action serving to store the multiplicand in the machine, to print the multiplicand, to clear the keyboard and to bring the multiplier mechanism into cooperative relation with the keys 10.

The multiplicand is stored in the machine by connecting a series of selecting fingers with the appropriate partial product plates 142 (Figs. 3, 13 and 14). These plates extend across the rear portion of the machine and are differentially stepped along their rear edges to represent partial products. The differential steps are duplicated at the opposite ends of the plate 142 so that contact of the opposite steps with two plates or fingers (hereinafter described) will hold the plate 142 in correct alignment. The upper plate is formed to represent the one table, which is, of course, entirely units. The second plate corresponds to the tens of the partial products involving a multiplicand of two, the plate immediately below this representing the units of said partial product. The remaining plates alternate between the tens and units of the partial products, involving the multiplicands 3 to 9 in the same manner. The tens selecting fingers 143 when in zero position are engaged with a retaining member or ledge 144, and are pivoted at their forward ends each to a stop arm 145 movable about a shaft 146. The arms 145 and fingers 143 are drawn toward their lower and rearward positions respectively, by means of springs 147. The setting of the multiplicand key, as previously stated, sets mechanism which will rock the stop arms 145 and tens selecting fingers 143, during the movement of operating lever 23. This mechanism comprises a shaft 148 having a shoulder adapted in the rotation of said shaft to engage a lug of each of the arms 145 to rock said arms slightly upward, around supporting shaft 146. Shaft 148 is connected by a crank arm 149 (Fig. 15) and connecting rod 150 with an arm 151 pivoted upon the frame of the machine. Connecting rod 150 is provided with a pin 152 engaged by the multiplicand key 136, in order to rock the members 149, 150, 151 sufficiently to bring a pin 153 of the latter member into the path of movement of a cam lug 154 of a pawl 155 pivoted upon an arm 156 of the operating shaft 24. Thus, upon operation of shaft 24 by the operating lever 23, lug 154, through pin 153 will rock the connections 151, 150, 149 and the stop arms 145 as stated. At the end of the forward movement of lever 23 pin 153 will escape from cam lug 154 and an arm 157 of pawl 155 will engage a pin 158 of arm 151 and rock the arm reversely sufficiently to bring the pin 153 below cam lug 154. Upon the return movement of lever 23 cam lug 154 will act upon pin 153 to move the parts reversely to normal position. During this displacement of the stop arms 145 the tens selector fingers 143 are pulled forwardly out of engagement with the zero ledge 144 or with the ends of plates 142 and a pin 159 of each finger is brought beneath a shoulder 160 of plunger 161 connected to the related lever 13. During the movement of the handle and while the fingers 143 are held in forward position the levers 13 are rocked until the stop bars 14 contact with the depressed keys, this serving to depress the fingers 143, through the plungers 161, until the rearward end of each finger is positioned opposite to a plate 142 corresponding to the key depressed. While held in this position the fingers 143 are allowed to move rearwardly under the influence of their springs 147 and their forked ends will engage and be held in contact with the selected plates 142.

The levers 13 having been advanced in accordance with the key setting, the printing of the multiplicand set on the keyboard will occur in the usual manner and the automatic key release mechanism will also operate as usual to release the keys 10. The multiplicand key, having been latched by a lug of the key release bail 88, will also be released and restored to normal with the keys 10.

The machine is now in normal condition, except that the multiplicand previously set up in the keys 10 is now stored in the machine by the engagement of the fingers 143 with the appropriate partial product plates 142.

The multiplier is now set up on the keys 10 and a multiplier lever 162 is pulled forwardly (see Figs. 3, 14, 15 and 16). Operation of lever 162 has a number of functions. It disconnects the segments 17 from the stop bars 14, and completes the positioning of the control members for said segments to operate in connection with the partial product plates; it disables the automatic keyboard clearing mechanism of the machine; it releases a lock normally detaining the multiplier selector plates (hereinafter described) in neutral position; it sets successive order mechanism into operative position, whereby the entire multiplier may subsequently act to control the operations of the machine, order by order upon successive reciprocations of lever 23; it sets the mechanism into position to operate in accordance with the first digit of the multiplier and finally it sets mechanism into position for automatically stepping the register carriage to the left.

It will be remembered that the tens selecting fingers 143 were positioned to select the plates 142 representing the multiplicand, previous to the setting up of the multiplier. It remains to bring a member into proper cooperating position with each of these fingers to effect the selection of the units of the product. These members comprise extensions 163 (Fig. 3) of the links 16, which links in the multiplier operation become units selection fingers. During general operations they are connected to the levers 13 by pin and slot means 164 and springs 165 tend to move the pin of this connection out of the open end of the slot. This movement is normally resisted by a guide finger 166 fixed upon a shaft 167. Shaft 167 is connected with the multiplier lever 162 by means of crank arm 168 (Figs. 15 and 16) on said shaft, connecting rod 169 and an arm 170 fast upon the shaft 171 to which the multiplier lever 162 is fixed. Thus, upon setting of lever 162 to its forward operative position (where it is held by means of a full stroke arm 172 (Fig. 4) cooperating with a lug 173 of the pawl 79) shaft 167 will be held in rocked position and the guide finger 166, moving away from the pins 174 of the links 16 will permit the springs 165 to move said links upward until a pin 175 of each link contacts with the tens selecting finger 143 of the same order. This brings the end of the extension 163 of the link 16 into position opposite the units plate 142 bearing the unit values related to the tens values selected by the fingers 143. It will be noted that if the fingers 143 remain in zero position, the related extensions or fingers 163 will come to position entirely above the plates 142 and into stopping contact with the lower flange of the ledge 144 and that if the forked ends of the fingers 143 engage the lower flange of the ledge 144, illustrated in Fig. 3 (this being the one table position of the fingers 143), the related fingers 163 will come to position opposite the upper or one table plate 142. This completes the selection of the units and of the tens of the partial product to be registered.

It may be noted that in the machine illustrated there are no segments 17 to the left of those connected with the keyboard mechanism, and therefore, in multiplication it is necessary to reserve the extreme left hand column of selector mechanism for registering the tens of the partial product involving the highest order multiplicand digit. Thus, in multiplication the extreme left hand bank of keys is not used either in setting up a multiplier or a multiplicand. There being no units to register in this denominational order, the connecting link 16 has no extension 163 (Fig. 16) and when the link is raised out of engagement with the corresponding lever 13 it is held by a suitable stop (not shown) on the frame of the machine.

In order to disable the automatic keyboard clearing means while the multiplier lever 162 is set in active position a finger 176 (Fig. 10) is fixed upon shaft 171, said finger being adapted to contact with a stud of the pawl 93 of the clearing mechanism to hold this stud out of the path of movement of lever 94, so that the clearing bail 88 will not be rocked upon movement of the operating lever 23.

The multiplier figures are set up by means of two plates 177 (Figs. 3, 13 and 14), these plates being laterally movable along the double differentially recessed portions of the plates 142. The plates 177 are urged by means of a spring 178 toward the right hand side of the machine, from their normal position out of register with the partial product plates 142, in which normal position they are held by a retaining finger 179 (Fig. 14). Said finger has pin and slot connection at 180 with the frame of the machine, and at its forward end is connected with a crank arm 181 of shaft 171. The end of finger 179 normally lies to the right of one of the plates 177, but upon rocking of shaft 171 by the multiplier lever 162, finger 179 will be drawn forward out of engagement with the plate 177, so that the two plates will be free to move to the right in accordance with the multiplier setting.

The digits of the multiplier set on the keys 10 control the operation successively, beginning with the highest order digit so set. The determination of the multiplier digit which is to be put in control of the operation at any given time is determined by raising the related type bar 15 from its normal into its zero registering position, by rocking the selector lever 13 counter-clockwise about its shaft from the position shown in Fig. 3 this bringing the rear end 182 (Figs. 3 and 16) of the selector lever 13 into position to cooperate with the mechanism hereinafter described. In order that the multiplication operation may begin at the highest order in which a multiplier has been set on the keys 10, means are provided for feeling out the denominational setting, from left to right, before putting the escapement mechanism in control, this mechanism also acting to set the highest order type bar 15 to zero position upon movement of the multiplier lever 162 to forward position. The spring means referred to above for rotating the shaft 184 comprises a spring urged segment 193 (Fig. 16) mounted in a frame 194, which frame also supports the shaft 184. As lever 162 is moved forward an extension 195 of the arm 170 will fall away from the stud 196 fixed in the segment 193, and will allow said segment to rotate under the influence of its spring until a stop pin 197 (there being a series of such stop pins arranged spirally about the shaft) engages the shoulder 198 of the highest order latch 21 which has been released by depression of a key. This will position the corresponding pin 183 opposite to the surface 185 of a lever 13, and the pin will operate to move the lever to zero position upon forward movement of the shaft 184 by a rocking movement of the frame 194 caused by engagement of said frame by the arm 170, toward the end of the forward movement of lever 162. This forward movement of shaft 184 places ratchet 186 in proximity to pallet 187, ready to be engaged thereby, as above-described. The successive raising of the type bars 15 to zero position is accomplished by means of a series of pins 183 (Figs. 3 and 14) arranged in a spiral about a shaft 184 and adapted to contact with surfaces 185 of the respective levers 13, upon rotation of said shaft. Shaft 184 is movable endwise in its bearings and is normally positioned with a ratchet wheel 186 (Fig. 15) out of alignment with an escapement pallet 187, said pallet having a depending finger 188 lying in the path of movement of the arm 156 of the operating shaft 24. Shaft 171 of the multiplier lever 162 has a fixed arm 189 provided with a pin 190 adapted to engage an arm 191 loosely mounted upon the shaft 171. Upon movement of multiplier lever 162 to operative position, arm 189 will move arm 191 into engagement with a cam boss 192 (Fig. 14) on the end of shaft 184, so that said shaft will be moved to the right and held in position with the ratchet 186 in alignment with the pallet 187. Thus, upon each reciprocation of operating lever 23 and shaft 24, arm 156 will operate the pallet to provide an escapement movement for the shaft 184. Thus on each pull of the operating handle 23 a left hand pin 183 of the shaft 184 will be moved out of contact with the surface 185 of the related lever 13 and, the shaft rotating under the influence of the spring means, the next right hand pin of said shaft will contact with the surface 185 to move the lower order lever 13 to zero position.

As will be explained in detail later the register carriage escapement is operated by a counter-clockwise movement of trigger 199 (Fig. 15) about its pivotal point 200, and upon movement of multiplier lever 162 to active position, means will be set whereby this movement of trigger 199 will be effected near the end of each return movement of operating lever 23, and immediately after the unlocking of the carriage by cam 76. A hook arm 201 pivoted upon a crank arm 202 fast to the operating shaft 24 rests at its free end upon a stud 203 fixed in one arm of an intermediately fulcrumed lever 204. Hook arm 201 is thus reciprocated with operating shaft 24 but is normally held with its hook end out of engaging relation with the pivot 200 of trigger 199. The upper end of lever 204, however, extends in front of a pin on arm 189 of multiplier lever shaft 171, so that as the multiplier lever is swung forward this pin will contact with lever 204 and will move the supporting stud 203 to a position in which the reciprocation of hook arm 201 will allow the terminal hook thereof to cam over and engage the pin 200 during the forward movement of operating lever 23. During the first part of the reverse movement of the lever 23 the rear end of hook arm 201 is raised, but in the continued movement crank arm 202, getting further from the dead center position of the parts, will pull hook arm 201 rearwardly, thereby rocking trigger 199 about point 205. Continued movement of lever 23 will now bring a cam surface 206 of hook 201 into contact with the stud 203, raising said hook out of engagement with pin 200 and allowing the trigger 199 to operate the escapement mechanism and space the register carriage to the next denominational position.

The machine being now completely set for the computation of the first partial product, operating lever 23 is reciprocated, whereupon the following actions take place:

The partial product plates 142 form stops to limit the movement of the segments 17, very much as this movement was limited by the stop bars 14 in ordinary operations. During the setting of the parts to multiplying position, the plates and consequently the segments 17 were held in neutral position by contacting with arms 207 (Figs. 3 and 4) pivoted at 208 and contacting at their upper portions with rollers 209 mounted on the levers 94, which as previously described reciprocate in time with the operating lever 23. The surfaces 210 of the arms 207 contacting with the rollers 209 are extended to form a dwell during the first part of the operation of lever 23, during which the plates 142 will remain locked, to afford time for the proper positioning of the multiplier selector plates 177 in accordance with the first multiplier digit.

The plates 177 are mounted in a frame slidable upon a shaft 211 (Figs. 3 and 13), said frame including a rack bar 212 meshing with a pinion 213, mounted on a stationary part of the machine frame. A pinion 214 is fast with the pinion 213 and meshes with a crown segment gear 215 fixed upon an arm 216 pivoted at 217 and provided with a link 218 connecting it with an arm 219 loose on the operating shaft 24. An arm 220 fast upon shaft 24 engages a stud of arm 219, and holds arm 216 and the rack 212 to the left, against the tension of spring 178, previously described. As the operating lever 23 is rocked arm 220 will move and allow these parts to respond to the urge of spring 178, until they are stopped by the following connection with the stop bars 14 of the keyboard mechanism: Arm 216 is provided with a spring latch 221 (Fig. 16) normally held in inactive position by engagement with a pin 222 on a fixed frame of the machine. Upon forward movement of operating lever 23, arm 216, in rising will disengage latch 221 from the restraint of pin 222, whereupon said latch will move forward into position beneath the end 182 of the lever 13 previously set in zero position by the operation of lever 162. The latch 21 being out of engaging position with the stop bar 14 in the column wherein the highest order multiplier digit is set, the pull of spring 178 will move the train of connected parts, raising the type bar 15 and moving the multiplier selector plates 177 along the partial product plates 142, until the lug 19 of stop bar 14 contacts with the stem of the depressed key, this brings the proper type into position to print the first digit of the multiplier and brings the multiplier selector plates 177 opposite the differential step of the plates 142 representing said digit.

A lock and locator mechanism is provided to hold the parts in this position, comprising a finger 223 (Figs. 13 and 15) adapted to engage a comb 224 on the lower edge of rack bar 212, and operable by pin 225 in an arm 226 fast upon the shaft 227 to which lever 94 is secured. Lever 94 being connected with operating lever 23, the pin 225 during the operation will engage a cam face 228 of finger 223 and cam the same into engagement with the comb.

These multiplier selector plates 177 now form stops which will control the degree of movement allowed to the segments 17 (urged by their springs 22) in registering the first partial product. Obviously, the greater the movement allowed by the notched portion of any partial product plate before contact is made with the multiplier selector plate, the greater the degree of movement given to the segments 17 and register wheels 111. Each of the partial product plates has a characteristic profile allowing for sufficient movement of the segments to register the partial product corresponding to the factors selected by the multiplier plates 177 and multiplicand selectors 143 and 163. Since mechanism of this general character is well known, and since the profiles of the plates are governed by mathematical conditions, it will be unnecessary to illustrate the various profiles individually in the drawings.

According to the present invention the mechanism controlling the segments 17 is adapted to give these segments their ordinary movement, representing the unit values of the partial product and also to give said segments an additional movement, past their normal position of rest, representing the value of the tens of the next lower partial product value, each segment 17 (except that of lowest and highest order) being thus adapted to be moved in accordance with the units and also in accordance with the tens value.

In order to secure this operation, the bail 20 is not directly connected with the segments 17, but engages a toothed sector 229 (Fig. 3) which in turn is provided with a lug 230 engaging a lug 231 of the related segment 17. As bail 20 is carried forward around point 32, the sectors 229 will be stopped by contact with any of the lower order stop arms 145 which have been adjusted into a depressed position determined by the partial product plate 142 engaged by the respective finger 143 (Fig. 18). The stops 145 are provided with laterally bent ends projecting across the path of the sectors 229 of higher order, thus providing a cross-over, whereby the tens may be carried up from a lower order and merged with units of a higher order. Bail 20, however, will continue movement about point 32 to its extreme position, when means will become operative to rotate the bail proper in bearings in its side plates, to bring an edged portion of the bail into contact with one of the teeth of sector 229. It will be obvious that the sectors 229 will be stopped and engaged by the bail differentially, in accordance with the tens of the selected partial product, while the segments 17 will also be differentially stopped in their upward movement in accordance with the units of the partial product selected. The segments 17 will, therefore, be pulled back to normal position a number of steps corresponding to the units and, by the sectors 229, beyond normal, a number of steps corresponding with the tens of the partial product. The rotating movement of bail 20 is effected by means of a plate 232 (Fig. 17) fixed upon the bail 20 proper, and adapted to engage a stationary projection 233 at the extremity of the forward swing of bail 20 about point 32 and forward movement of frame 33 about point 36, to rotate the bail as stated. Lug 233 is fixed upon the lever 204 (Fig. 15) which, as previously described, is set into active position upon setting of the multiplier lever 162. Thus the bail 20 which is normally reciprocated without rotary motion will be given a rotary motion during multiplier operations. A latch 234 serves to hold the bail in rotary position as adjusted. As bail 20 is rocked back to normal position, the plate 232 will contact with the stud 235 on the frame 33 and rotate bail 20 back to its normal position in which it will be engaged by a long terminal tooth of the sector 229, to hold the segments 17 again in normal position.

During the movement of operating lever 23, also, the segments 17 will be engaged with the register gears 112, and after operating the same will be disengaged, and the printing hammer of the single type bar which is set to active position will be tripped, all as in the operations previously described.

It may be noted that while the finger 163 has a reciprocatory movement in the operation above-described, the feelers 143 will remain in adjusted position, maintaining the multiplicand setting by engagement of said fingers with the respective plates 142.

The above-described method of performing multiplication involves a maximum registration of 17 unit spaces upon any given register wheel 111 upon each operation of the segments 17, since nine units and eight tens may have to be registered upon such wheel. Since also a registration of a maximum of nine units may stand upon the register wheel 111 before the registration in question is effected, it will be obvious that, in effecting a possible registration of 26, two tens carries to the next higher order wheel may be called for. This is made possible by the planetary differential gearing of the register, which, as has been noted, will permit the registration of the carry impulse on a register wheel simultaneously with the registration of an impulse imparted by the segment 17 related to said wheel.

The escapement mechanism hereinbefore described is operated during the movement of lever 23 in order to allow rotation of shaft 184 until the tooth 183 in the next lower order contacts with the surface 185, positioning the respective arm 13 and type bar 15 to zero position. The pin 183 which has previously moved the higher order type bar 15 to zero position, will, of course, be moved out of engaging position with the corresponding surface 185.

After the registration has been effected, the partial product plates 142 are moved back to normal position by the arm 207 and the multiplier selector plates 177 are unlocked from the finger 223 and are also moved to the left into their normal position, by engagement of the arm 220 with the pin of arm 219. As the arm 216 approaches its lower position, the latch 221 will engage the end 182 of the arm 13 which has been newly brought to zero position and, camming over the end of said arm will engage beneath the same and will release the arm 13 and type bar 15 previously operated, the latter falling to normal position.

As has been previously stated, the register carriage 46 is urged toward the left by a spring 71, and is held in adjusted position by the teeth 67 of the bar 68. The bar 68 is provided with trunnions 236 (Fig. 11) about which it may be rocked, being normally held in vertical position by means of a spring 237 (Fig. 15). The bar 68 is also provided with a rearward extension 238 having an upwardly bent end, over which end the trigger 199 snaps when said trigger is moved rearwardly by the action of hook arm 201, previously described. When hook arm 201 releases pin 200 and allows the trigger to be carried forwardly about point 205 by the spring 239, at the end of the movement of operating lever 23, trigger 199 will contact with the end 238 and will rock bar 68 to bring the engaging tooth 67 thereof out of alignment with escapement lug 66 of the collar 65, the carriage will move to the left, and bar 68 being instantly released from the trigger 199 will rock back, to position the next adjacent tooth 67 into the path of escapement lug 66.

The above-described operation whereby the multiplicand is multiplied by one figure of the multiplier, is repeated for each succeeding figure of the multiplier (including cyphers) by repeated reciprocations of the operating lever 23, and repeated operation of the parts just described.

At the end of the computation of the product, the total or the sub-total key is depressed, to record the product on the record slip 12, and means are provided whereby either the total or sub-total key will release the special mechanism set by the multiplier lever 162, and bring the machine into condition for transferring the product or total to the type bars 15.

For convenience in adjusting the carriage as may be required in different operations, a release bar 241 (Fig. 3) is connected to a shaft 242 (Fig. 4), said shaft having an arm 243 having a link connection 244 with a pin of escapement collar 65. Thus, pressure upon bar 241 will release lug 66 from the retaining tooth 67, whereupon the carriage may be manually positioned to the order desired and the bar 241 released.

It will be recalled that the multiplier lever 162 is latched in operative position by the pawl 79, contacting with a tooth of the full stroke arm 172 (Fig. 4), and that the pawl 79 is rocked about point 80 upon depression of the total or the sub-total key 77, 78. Thus, full stroke arm 172 will be released upon depression of either of these keys and the multiplier lever 162 will be returned to inactive position by a spring 240 (Figs. 3 and 4). This allows the various parts set by lever 162 to return to their normal positions. The total or sub-total key, having released the latches 21, all of the levers 13 will stand in normal position during this operation, and thus the release of lever 162 and rocking of shaft 167 back to its normal position will depress links 16 and bring the pins of connections 164 into the slots, recoupling the segments 17 with the stop bars 14. The fingers 143 will remain in engagement with any plate 142 with which they have previously been associated, but, since the bail 20 will not be rotated, until multiplier lever 162 has again been set, the stopping of the sectors 229 short of their full stroke positions will have no effect upon the subsequent operations of the machine.

*Pointing off the decimal*

Since the keys 10 of the machine have fixed relation to the type 34, it is obvious that amounts set up on the keys will be printed in definite ordinal positions on the record strip 12. Therefore, if a multiplicand and a multiplier are successively set up on the keyboard with relation to a common decimal point, such amounts will be printed on the record strip 12 with the decimal point indicated by a line on the record strip. Means are also provided whereby the register carriage 46 will be automatically positioned in multiplication so that the product will be registered in proper relation to a fixed decimal point on the carriage.

These means act automatically upon operation of the multiplier lever 162 to space the carriage to the left (unless there is a multiplier figure of the highest order provided for) and to position the carriage in accordance with the displacement of the highest order key locking plate 18.

For this purpose a shaft 249 (Figs. 3, 4 and 17) is mounted in the frame of the machine adjacent to the carriage 46 said shaft being provided with two series of stop pins 250 and 251 arranged in two reversely disposed spirals about said shaft, the related pin 250 being adapted upon clockwise rotation of shaft 249 as viewed in said figures, to contact with the highest order key locking plate 18 which is held by a set key 10 in forward position. This will bring a particular pin 251 into the path of movement of a stop lug 252 upon the carriage 46. The spiral arrangement of the two sets of pins 250 and 251 is reversely arranged, so that for each left hand column of the machine in which no key 10 is set, the carriage 46 will be allowed a one step movement to the left, until held in registering position by contact of a tooth 251 with a stop lug 252.

Shaft 249 is rotated by a spring impelled segment 253 and is normally held against movement by contact of a lug 254 of shaft 249 (Fig. 15) with a tooth of intermediately fulcrumed lever 255, the lower end of which is provided with a cam tooth engaging a lug 256 of the lever 204, which lever it will be remembered is displaced upon movement of multiplier lever 162 to set position. Lever 204 is also provided with a finger 257 (Fig. 17) normally held by a tooth 258 of shaft 249 out of position of contact with a shoulder 259 of the extension 238. If, however, upon setting of lever 162, shaft 249 is allowed to rotate, tooth 258 will move away from finger 257, and said finger will be drawn over the shoulder 259, whereupon downward movement of lever 204 will act to tilt bar 68, freeing the tooth 67 thereof from the stop lug 66 of the carriage, allowing the carriage to respond to the pull of spring 71 until stopped by contact of a pin 251 with the lug 252.

The carriage 46 having been correctly positioned, and locked in said position by operation of bar 72, upon the first operation of lever 23, the automatic positioning mechanism will be restored to normal position by contact of a pin 260 (Fig. 4) of the arm 29 with segment 253, said segment being forced upwardly, in the movement of lever 23, rotating shaft 249 to normal position, in which it will be held by reengagement of lug 254 with the end of lever 255. Upon the restoration of shaft 249 to normal position, tooth 258 (Fig. 17) will move finger 257 out of engagement with shoulder 259 and bar 68 will be rocked by spring 69 back into position of cooperation with the stop lug 67.

Upon completion of the multiplier calculation, levers 162 and 204 being released, lug 256, in rising, will, by means of a laterally beveled surface of said lug, tilt lever 255 to allow seating of lug 256 above the cam tooth of said lever. Lug 254 is sufficiently wide to allow for this movement without disengagement of said lug from the top of lever 255.

For convenience in setting the two factors on the keys 10 in the same denominational relation, a decimal line 261 may be marked upon the keyboard plate and a similar mark may be employed on the carriage 46. In using the machine, however, it is not essential that the decimal point be placed with relation to mark 261, as the decimals will be correctly positioned with relation to any common decimal point selected upon the keyboard. In the example shown mark 261 is placed between the fifth and sixth columns of the keyboard, so that the printed product will be carried to five decimal places. Obviously any other desired position for mark 261 may be chosen.

It will be recalled that the extreme left hand column is used to calculate the tens of the next lower order multiplier, so that the left hand column of the keys 10 is not available for setting a multiplier. The capacity of the machine herein illustrated is 999.99999×99.999, giving a product of 99989.99900001, but it is obvious that any desired capacity can be built into the machine.

Operation

To perform a multiplication, the machine being clear, the add key depressed, and the register carriage 46 positioned at the extreme right, the multiplicand is set in the keys 10 with relation to the fixed decimal point. The multiplicand key is now depressed, or this key may be depressed before the multiplicand is set up. Operating lever 23 is now reciprocated, whereafter the multiplier is set up on the keys 10 with relation to the fixed decimal point. The multiplier lever 162 is drawn toward the front of the machine, in which position it will be latched. The operating lever 23 is now reciprocated once for each digit of the multiplier. The product will now appear in the register wheels 111, and if it is desired to retain the product in these wheels, the sub-total key 77 is depressed and lever 23 reciprocated, whereupon the product will be printed on the record strip 12 and the machine restored to normal condition. If it is desired to clear the wheels 111 when the product is printed on the record strip, the total key 83 is depressed instead of the sub-total key. If it is desired to obtain the complement rather than the true product, or in other words if it is desired to multiply subtractively, the subtract key is depressed at any time before the lever 23 is operated to register the product, the depression of the subtract key effecting return of the add key to raised position. In this case, it is necessary to depress the add key before taking a total, to print the product, and means are provided for locking the total and sub-total keys while the subtract key 48 remains in depressed position. This means comprises a slide plate 245 (Fig. 4) held by a spring 246 against a cam surface 247 of the subtract key 48 when said key is in raised position. In this position lugs 248 of slide 245 are held out of engagement with notches in the stem of the total and sub-total keys 83 and 77. Upon depression of the subtract key 48, cam surface 247 being removed from the end of slide 245, said slide will move to engage the lugs 248 in the notches of the keys, to lock the same against depression.

The machine is provided with a rotary platen mounted on a transversely shiftable carriage, and may be provided with the usual line spacing and tabulating devices.

What is claimed is:

1. In a listing calculating machine having partial product plates and product mechanism cooperating therewith; type bars, means for setting up a multiplicand selectively with relation to said plates, means for setting up a multiplier selectively with relation to said plates, and a digit selecting keyboard comprising keys common to said type bars, to said multiplicand and to said multiplier setting means.

2. In a listing calculating machine having partial product plates and product mechanism cooperating therewith; type bars, means for setting up a multiplicand selectively with relation to said plates, means for setting up a multiplier selectively with relation to said plates, a digit selecting keyboard comprising denominational banks of digit keys cooperating simultaneously with said type bars and with said multiplicand setting means, and means whereby a preset series of the same keys may successively control their related type bars and may simultaneously control said multiplier setting means.

3. In a calculating machine having adjustable selecting devices and registering mechanism; a series of reciprocatory differential actuators, means for limiting the forward movement of said actuators in accordance with the adjustment of said selecting devices, and means for differentially extending the return movement of said actuators to modify the effective movement thereof.

4. In a calculating machine having product computing means including a keyboard whereon a complete multiplier of one or more digits may be set, a denominationally shiftable carriage, and register wheels thereon; means for effecting a product registration, and means operable automatically at the first operation of said means to shift the register carriage to the left, into a position determined by the highest order set multiplier key.

5. In a calculating machine having product computing means including denominational banks of settable digit selecting keys adapted to represent a complete multiplier of one or more digits, a denominational series of members displaced by the set keys, a denominationally shiftable carriage, and register wheels thereon; an abutment on said carriage, means for effecting a product registration, and means operable automatically at the first operation of said means to shift the register carriage to bring said abutment in contact with the highest order displaced denominational member.

6. In a listing calculating machine having multiplicand mechanism, multiplier mechanism and product computing means; a series of type bars provided with digit type, means for automatically setting said bars to represent, at the printing line, a multiplicand set in said mechanism, and means for automatically setting one of said bars to represent, at the printing line, a single digit of a multiple digit multiplier set in said mechanism.

7. In a listing calculating machine having multiplier mechanism including a denominational series of differentially settable digit selecting members; a series of type bars provided with digit type, means for placing the set selecting members successively in control of a multiplier operation and for concomitantly setting successive type bars in accordance with the selected digits.

8. In a listing calculating machine having partial product plates each representing a given multiplicand digit, and means for setting up a multiplicand; an operating member, means operable by said member to print the multiplicand, and means concomitantly operable by said member to place the corresponding plates in controlling condition.

9. In a listing calculating machine having partial product plates each representing a given multiplicand digit, and means including settable digit keys for setting up a multiplicand; an operating member, means operable by said member to print the multiplicand, means concomitantly operable by said member to place the corresponding plates in controlling condition, and means concomitantly operable by said member to release the set digit keys.

10. In a multiplying machine having a multiple order keyboard, a denominational series of plates displaceable by the related keys, differentially settable value determining slides mounted in fixed relation to said keyboard and slide-control levers governed each by a row of keys; an adjusting frame, and means operable to connect said frame successively with given control levers, including a rotor provided with a spirally arranged series of stops operable to engage the displaced plate of highest denominational order, whereby the related digit key will control a slide and thereby select the first multiplier figure to be set.

11. In a multiplying machine having a multiple order keyboard, a denominational series of plates displaceable by the related keys, a transversely shiftable carriage, register wheels thereon, and means to control a registration on said wheels by a multiplier value set in said keyboard; an abutment on said carriage, and a rotor provided with spirally arranged series of stops operable to engage the highest order displaced plate and to be engaged by said abutment, to bring the register wheels into correct decimal relation with the key representing the first multiplier figure.

12. In a multiplying machine having a multiple order keyboard, differentially settable value determining slides mounted in fixed relation to said keyboard and slide-control levers governed each by a row of keys; an adjusting frame, means operable to connect said frame successively with given control levers, a series of spring impelled links, and means for disabling the frame connecting means and connecting said links with the control levers, whereby a plurality of slides may be successively and at another time simultaneously controlled by the depressed keys.

13. In a listing multiplying machine having a multiple order keyboard, differentially settable type bars mounted in fixed relation to the keyboard and type setting levers connected each to a bar and governed each by a row of keys; an adjusting frame, means operable to connect said frame successively with given setting levers, a series of spring impelled links, and means for disabling the frame connecting means and connecting said links with the setting levers, whereby a plurality of type bars may be successively and at another time simultaneously set to correspond with the depressed keys.

14. In a multiplying machine having register wheels, actuating segments therefor, a multiple order keyboard, differentially settable partial product plates mounted in fixed relation to said keyboard and plate-control levers governed each by a row of keys; an adjusting frame, means operable to connect said frame successively with given control levers, to place depressed digit keys in various denominational rows successively in control of the plates and thereby provide for the setting therein of partial products corresponding to multiplier values, multiplicand mechanism including a series of links normally connecting the actuating segments with the control levers, and means for disabling the frame connecting means and connecting said links with said plates.

15. In a multiplying machine having register wheels, actuating segments therefor, a multiple order keyboard, differentially settable partial product plates mounted in fixed relation to said keyboard and plate-control levers governed each by a row of keys; an adjusting frame, means operable to connect said frame successively with given control levers, to place depressed digit keys in various denominational rows successively in control of the plates and thereby provide for the setting therein of partial products corresponding to multiplier values, multiplicand mechanism including a series of links, normally connecting the actuating segments with the control levers, and means for disabling the frame connecting means, and means including fingers, positioned by the control levers in accordance with a multiplicand value set on said keys, for connecting said links with said plates.

16. In a multiplying machine having a multiple order keyboard, differentially settable value determining slides mounted in fixed relation to said keyboard and slide-control levers governed each by a row of keys; an adjusting frame, and means operable to connect said frame successively with given control levers, to successively control the slides by depressed digit keys in various denominational rows and thereby provide for the setting of corresponding multiplier values.

17. In a multiplying machine having a multiple order keyboard, differentially settable partial produce plates mounted in fixed relation to said keyboard and plate-control levers governed each by a row of keys; a selecting finger, an adjusting frame therefor, and means operable to connect said frame successively with given control levers, and to move said finger along the plates, whereby depressed digit keys in various denominational rows placed successively in control of the plates, provide for the setting therein of partial products corresponding to multiplier values.

18. In a multiplying machine having a multiple order keyboard, differentially settable partial product plates mounted in fixed relation to said keyboard and plate-control levers governed each by a row of keys; a selecting finger, an adjusting frame therefor, means operable to connect said frame successively with given control levers and to move said finger along the plates, whereby depressed digit keys in various denominational rows, placed successively in control of the plates, provide for the setting therein of partial products corresponding to multiplier values, and multiplicand mechanism including a series of links each engageable selectively with any one of said plates.

19. In a multiplying machine having a multiple order keyboard, differentially settable partial product plates mounted in fixed relation to said keyboard and each provided with two duplicate stepped edge portions, and plate control levers governed each by a row of keys; two rigidly connected selector fingers, an adjusting frame therefor, and means operable to connect said frame successively with given control levers and to move said fingers in unison across the two stepped portions, whereby depressed digit keys in various denominational rows, placed successively in control of the plates, provide for the setting therein of partial products corresponding to multiplier values.

EDNA B. GARDNER,
*Administratrix of Clyde Gardner, Deceased.*